United States Patent Office 3,067,198
Patented Dec. 4, 1962

3,067,198
19-OXYGENATED STEROIDS AND PROCESS FOR THEIR MANUFACTURE
Albert Wettstein, Riehen, Georg Anner, Karl Heusler, and Jaroslav Kalvoda, Basel, and Hellmut Ueberwasser, Riehen, Switzerland, assignors to Ciba Corporation, a corporation of Delaware
No Drawing. Filed July 10, 1961, Ser. No. 122,655
Claims priority, application Switzerland, July 15, 1960
9 Claims. (Cl. 260—239.55)

The present invention provides a process for the manufacture of 19-oxygenated $\Delta^5$-steroids from 5α-halogeno-6β:19-oxido-steroids. The aforementioned 19-oxygenated steroids are valuable intermediates for the manufacture of pharmacologically important 19-nor steroids, for example of derivatives of 19-nor-testosterone and 19-nor-progesterone. Above all, 19-nor-17α-methyl-testosterone, 19-nor-17α-ethenyl testosterone and certain esters of 19-nor-testosterone have lately been used as therapeuticals.

All these compounds have hitherto been accessible only by reducing steroid compounds having an aromatic ring A which themselves had to be prepared from unsaturated 3-keto steroids by thermal elimination of the angular C–19-methyl group and simultaneous aromatisation. The 19-oxygenated $\Delta^5$-steroids which are now readily accessible by the present process enable 19-nor steroids to be prepared in an extremely simple manner without requiring preliminary aromatisation of the ring A.

According to the new process 5α-halogeno-6α:19-oxido-steroids are treated with reducing agents.

The starting materials may contain in position 19 also a hydroxyl or oxo group, that is to say it is also possible to use hemiacetals of 6β-hydroxy-19-oxo-steroids or 19:6β-lactones of 6β-hydroxy-steroid-19 acids. The starting materials belong to the spirostane, androstane, pregnane, cholane, chloestane, stigmastane, spirostane or cardanolide series and may contain in the cyclic system, more especially in one or several of positions 1, 2, 3, 4, 5, 7, 8, 9, 11, 12, 14, 15, 16, 17, 20 and 21 further substituents such as free or functionally converted oxo groups, esterified or etherified hydroxyl groups, alkyl (for example methyl) groups and/or halogen atoms. The term "functionally converted oxo groups" designates ketalized oxo groups or oxo groups converted into enol derivatives, for example enol ethers or enol esters. Furthermore, the starting materials may contain double bonds or oxide groups, for example in positions 4:5, 9:11 or 16:17.

Particularly valuable starting materials are 5α-halogen-6β:19-oxides containing in position 3 a free, esterified or etherified hydroxyl group or a ketalized oxo group, since when such compounds are used it is easy, following upon the reduction according to the present process, to introduce in known manner a $\Delta^4$-3-oxo grouping which facilitates the elimination of the angular C–19 substituent.

The starting materials are obtained by the process described in copending applications No. 122,657 and No. 122,654 by reacting a compound containing positive, monovalent halogen or a heavy metal acylate having an oxidizing action, particularly lead tetraacylate, with a 19-unsubstituted 5α-halogen-6β-hydroxy-steroid. In the first mentioned process such conditions are chosen for the reaction as bring about the homolytic cleavage of any 6-hypo-halite formed. As compound containing positive monovalent halogen there are preferably used chlorine, bromine and iodine derivatives, such, for example, as N-halogencarboxylic acid amides and imides, for example N-chloracetamide, N-bromacetamide, N-chloro-succinimide, N-bromosuccinimide, N-iodosuccinimide, 1:3-dibromo-5:5-dimethyl-hydantoin, and also chlorine monoxide cyanogen chloride, cyanogen bromide and cyanogen iodide. The use of hypohalogenous acids and their derivatives, for example alkyl-hypohalites, such as tertiary butylhypochlorite, tertiary butylhypobromite, is particularly advantageous. Alkylhypoiodites may be obtained, for example, from heavy metal oxides, such as mercuric oxide, silver oxide, lead oxide and the like with iodine and alcohols. The process may be carried out, for example, by dissolving or suspending the starting material in a solvent which is inert towards the oxidizing agent, for example a hydrocarbon, adding lead tetraacetate, iodine and a weak base, for example calcium carbonate, and heating the reaction mixture with stirring under atmospheric or superatmospheric pressure. The reaction may be performed in an analogous manner also with iodine and a silver acylate or iodine and a mercury acylate, for example an acetate, or with a complex formed from these reagents. Especially suitable solvents are saturated, cyclic hydrocarbons, such as cyclohexane, methylcyclohexane, dimethylcyclohexane; but aromatic hydrocarbons, such as benzene, or halogenated hydrocarbons, such as carbon tetrachloride, hexachloro butadiene, or mixtures of these solvents, may also be used. The reaction time depends on the temperature, or on the solvent used. Non-polar solvents favor the homolytic cleavage of the hypohalogenites as compared with the heterolytic cleavage which would lead to 6-ketones. The reaction is carried out at a raised temperature, for example between 50 and 150° C. The reaction is, in addition, accelerated by irradiating the reaction solution with visible and/or ultraviolet light.

According to the above-mentioned second process the starting materials are reacted, for example in the above-mentioned solvents and under similar temperature and pressure conditions with a heavy metal acylate having an oxidizing action. Lead tetraacetate is preferably used.

The above-mentioned hemiacetals of 6β-hydroxy-19-oxo-steroids or 19:6β-lactones of 6β-hydroxy-steroid-19-acids also used as starting materials are obtained by oxidation of the above 6β:19-oxido-steroids.

Specific starting materials for use in the present process are, for example, the following compounds:

3-hydroxy-5α-halogeno-6β:19-oxido-spirostanes and their esters, for example, 3β-acetoxy-5α-chloro-6β:19-oxido-spirostane, 3β:17β-dihydroxy-5α-chloro- and -5α-bromo-6β:19-oxido-androstane and their esters, 3β-hydroxy-5α-chloro- and -5α - bromo - 6β:19-oxido-17-oxo-androstane and their esters, 3β:17β-dihydroxy-5α-chloro- and -5α-bromo-6β:19-oxido-17α-alkyl- (more especially -17α-methyl- and 17α-ethyl)-androstane and their esters, 3β:17β-dihydroxy-5α-chloro- and -5α-bromo-6β:19-oxido-17α-allyl-androstane and their esters, 3β:20-dihydroxy-5α-chloro- and 5α-bromo-6β:19-oxido-pregnane and their esters, 3β-hydroxy-5α-chloro- and 5α-bromo-6β:19-oxido-20-oxo-pregnane and their esters, 3β-hydroxy-5α-chloro- and 5α-bromo-6β:19-oxido-16:17α-oxido-20-oxo-pregnane and their esters, 3β:17α-dihydroxy-5α-chloro- and 5α-bromo-6β:19-oxido-20-oxo-pregnane.

Furthermore, there may be used 19:6β-lactones of 5α-halogeno-6β-hydroxy-steroid-19-acids obtained by oxidizing corresponding 5α-halogeno-6β:19-oxido steroids; this can be carried out, for example, by treating the 6β:19-oxides with strong oxidants, for example with ruthenium tetroxide or more especially with a derivative of hexavalent chromium, such as chromic acid or tertiary butyl chromate, in a solvent such, for example, as a lower fatty acid such as acetic or propionic acid or in a chlorinated hydrocarbon such as carbon tetrachloride, more especially at an elevated temperature ranging from 50 to 100° C.

The 5α-halogeno-6β:19-oxides are very stable towards hydrolytic agents. However, the opening of the 6β:19-oxygen bridge is easy to perform under reductive conditions, more especially when a reducing agent is used that is suitable for reducing halohydrins to olefines. Particularly suitable are metallic reducing agents such as alkali metals or alkaline earth metals, such as sodium, potassium, lithium or more especially calcium, advantageously dissolved in liquid ammonia or in an amine such as ethylamine, isopropylamine, ethylenediamine or the like, if desired with addition of a diluent such as ether, tetrahydrofuran or dioxane.

Under the aforementioned reaction conditions $\Delta^5$-19-hydroxy-steroids are formed. The reductive opening of the 6β:19-oxides may be accompanied by reduction of other functional groups, such as other oxides, for example 16:17-oxides, or oxo groups unless they have previously been protected by ketalisation or enol ether formation.

In the case of the 19:6β-hemiacetals of 5α-halogeno-6β-hydroxy-19-oxo-steroids, and more especially of the 19:6β-lactones of 5α-halogeno-6β-hydroxy-steroid-19-acids, the reductive opening can be performed not only with the reducing agents referred to above but also under mild conditions, above all with zinc and a lower alcohol, such as methanol, ethanol or propanol, and particularly smoothly with zinc and a lower fatty acid such as acetic, propionic acid or the like. From the 5-halogeno-lactones a good yield of $\Delta^5$-steroid-19-acids is obtained.

Another object of the invention are $\Delta^5$-3:19-dihydroxy compounds of the spirostane, androstane and pregnane series and their esters, more especially $\Delta^5$-3:19-dihydroxy-spirostenes, for example 19-hydroxy-diosgenin, $\Delta^5$-3:19-dihydroxy-androstenes containing in position 17 a free or esterified hydroxyl group and, if desired, an alkyl, alkenyl or alkinyl radical, for example $\Delta^5$-3β:17β:19-trihydroxy-androstene, $\Delta^5$ - 3β:17β:19 - trihydroxy-17α-alkyl- more especially -17α-methyl-androstene, -17α-ethyl-androstene and 17-α-isobutyl-androstene, as well as their esters. Furthermore, there may be mentioned $\Delta^5$-3β:19-dihydroxy-pregnenes containing in position 20 a free or ketalized oxo group, for example $\Delta^5$-3β:19-dihydroxy-20-oxo-pregnene, $\Delta^5$-3β:17α:19-trihydroxy-20-oxo-pregnene, $\Delta^5$-3β:17α:19:21-tetrahydroxy-20-oxo-pregnene and similar compounds.

Another object of the invention is $\Delta^5$-3-hydroxy-19-acids of the androstane and pregnane series and their esters, more especially 19-acids of $\Delta^5$-3-hydroxy-androstenes that contain in position 17 a free or esterified hydroxyl group and, if desired an alkyl, alkenyl or alkinyl radical, or contain an oxo group, for example 19-acids and esters thereof of $\Delta^5$-3β:17β-dihydroxy-androstene and its 3:17-diacylates, of $\Delta^5$-3β-hydroxy-17-oxo-androstene and its 3 acylates, of $\Delta^5$-3β:17β-dihydroxy-17α-alkyl-, more especially 17α-methyl-androstene, -17α-ethyl-androstene and 17α-isobutyl-androstene and acylates thereof. Furthermore, there may be mentioned 19-acids and their esters of $\Delta^5$-3β-hydroxy-pregnenes containing in position 20 a free or esterified hydroxyl group or a free or ketalized oxo group.

The acid residues in the esters of the products of the invention are those of saturated or unsaturated aliphatic, cycloaliphatic, aromatic or heterocyclic carboxylic acids, preferably of lower aliphatic, monocyclic cycloaliphatic, aromatic or heterocyclic carboxylic acids, lower monocyclic araliphatic or cyclo-aliphatic carboxylic acids, especially those having 1 to 20 carbon atoms, for example those of formic, acetic, propionic acid, butyric acids, valeric acids such as n-valeric acid, or of trimethylacetic acid, caproic acids such as β-trimethyl-propionic acid, of oenanthic, caprylic, pelargonic, capric, undecylic acids, for example of undecylenic acid, of lauric, myristic, palmitic or stearic acids, for example of oleic acid, cyclopentyl-, cyclohexyl- or phenyl-acetic or propionic acids, of benzoic acid, phenoxyalkane acids such as phenoxyacetic acid, parachlorophenoxyacetic acid, 2:4-dichlorophenoxyacetic acid, 4-tertiary butyl-phenoxy-acetic acid, 3-phenoxypropionic acid, 4-phenoxybutyric acid, of furan-2-carboxylic acid, 5-tertiary butyl-furan-2-carboxylic acid, 5-bromo-furan-2-carboxylic acid, of nicotinic acids, and also of dicarboxylic acids such as oxalic, succinic or glutaric acids, of substituted carboxylic acids such as β-keto-carboxylic acids, for example of acetoacetic, propionylacetic, butyryl-acetic of caprinoylacetic acid, of aminoacids and the like.

The steroid-19-acids obtained by the present process are easy to convert into the corresponding methyl esters or ethyl esters, for example with diazomethane or diazoethane.

It is also possible to oxidize the oxygenated C-19-methyl group further, after having opened up the 6β:19-oxygen bridge, by the present process. Thus, for example, it is possible to obtain from a resulting $\Delta^5$-19-hydroxy compound a $\Delta^5$-19-acid, for example by oxidation with chromium trioxide in glacial acetic acid or acetone. Reaction with chromic acid in pyridine furnishes predominantly $\Delta^5$-19-oxo-compounds. If a free 3-hydroxy group is present, this group is advantageously protected before the oxidation, for example by selective esterification, e.g. acetylation by boiling in glacial acetic acid.

To manufacture the therapeutically valuable 19-nor-steroids the 19-oxygenated $\Delta^5$-3-hydroxy-steriods of the invention are converted into $\Delta^4$-3-oxo-steroids by oxidation, for example according to the Oppenauer method. From the resulting $\Delta^4$-3-oxo-19-hydroxy-steroids the angular hydroxy-methyl group can be eliminated, if desired, after oxidation to the aldehyde or acid group, by treatment with an alkaline agent, for example by heating with an alkali methal hydroxide in an anhydrous or aqueous solution with formation of 19-nor compounds. Thus, for example, a $\Delta^4$-3-oxo-19-hydroxy compound obtained by the present process yields, for example, the known 19-nor-testosterone, the 19-nor-progesterone and similar products.

The following examples illustrate the invention.

Example 1

100 cc. of ammonia are condensed at a bath temperature of 60° C. in a 4-necked flask equipped with stirring means, gas inlet tube, dropping funnel and reflux condenser with moisture closure and gas discharge tube. 1.00 gram of lithium metal is then added in portions and forms a blue solution in the ammonia. In rapid succession a solution of 3.00 grams of 3β-acetoxy-5α-chloro-6β:19-oxido-cholestane in 50 cc. of absolute ether is then stirred in dropwise. The cooling bath is then removed and the ammonia is evaporated in the course of 2 hours with stirring and while passing over a current of dry nitrogen, and at intervals of 20 minute portions of 25 cc. each of absolute ether are added. The excess lithium is destroyed with methanol, and the reaction mixture is acidified with dilute sulfuric acid, diluted with ether, and then worked up. The ethereal solution is washed successively with water, sodium bicarbonate solution and water, dried with sodium sulfate and evaporated under vacuum, to yield 2.52 grams of an oily product which crystallizes when sprinkled with methanol. On recrystallisation from methylene chloride+methanol is yields 1.130 grams of $\Delta^5$-3β:19-dihydroxy-cholestene (19-hydroxy-cholesterol) melting at 153–155° C. The infra-red absorption spectrum contains characteristic bands, inter alia, at 2.80, 6.86, 7.30, 7.36, 7.50, 9.25, 9.70, 9.85, 10.30, 10.48, 10.87, 11.30 and 11.90μ.

In the nuclear magnetic resonance spectrum the maximum of the C-19-methyl group is absent, but there appear maxima at 153–184 cycles and at 45–48.5 cycles which may be attributed to the protons of the —CH$_2$—OH and —CH=CH— groupings respectively.

In an analogous manner 5.0 grams of 3β-acetoxy-5α-chloro-6β:19-oxido-spirostane yield 3.6 grams of 19-hydroxy-diosgenin.

Example 2

750 mg. of lithium metal are dissolved in portions with stirring at −60° C. in 100 cc. of liquid ammonia. The blue solution is treated with 1.00 gram of 3β-acetoxy-5α-chloro-6β:19-oxido-17-oxo-androstane and rinsed with 50 cc. of absolute ether. While stirring, without external cooling, a current of dry nitrogen is then passed for 1.5 hours over the reaction solution and the evaporated ammonia is replaced by absolute ether. The excess lithium is decomposed with methanol, and the mixture is kept for 18 hours at room temperature, acidified with dilute sulfuric acid and extracted with chloroform, to yield 857 mg. of an oil which crystallizes on being sprinkled with ethyl acetate+ether. In this manner $\Delta^5$-3β:19:17-trihydroxy-androstene melting at 231–233° C. is obtained.

Example 3

From a solution of 350 mg. of $\Delta^5$-3β:19-dihydroxy-cholestene in 15 cc. of absolute toluene and 5 cc. of cyclohexanone about 5 cc. of solvent are distilled off, and the reaction mixture is treated with a solution of 470 mg. of aluminum isopropylate in 10 cc. of toluene and the whole is refluxed with stirring for 15 hours. The mixture is cooled, acidified with dilute sulfuric acid, taken up in ether, washed until neutral, dried and evaporated in vacuum. To free the residue from cyclohexanone and cyclohexanol it is subjected to steam distillation. The non-volatile matter is taken up in ether and the reaction product is isolated in the usual manner; it is obtained in the form of a non-crystallizing oil and is purified by chromatography on alumina. In this manner amorphous 19-nor-$\Delta^4$-3-oxo-cholestene is obtained in a yield of 15 to 20%. The infra-red absorption spectrum of the pure compound displays bands, inter alia, at 6.00, 6.85, 7.25, 7.35, 7.55, 8.30, 9.00, 10.36 and 11.30μ.

Example 4

A solution of 5 grams of 3β-acetoxy-5α-chloro-6β:19-oxido-17-oxo-androstane in 100 cc. of glacial acetic acid is treated at 85–90° C. in the course of 30 minutes with a solution of 7.5 grams of chromium trioxide in 7.5 cc. of water and 60 cc. of glacial acetic acid. After a further reaction period of 15 minutes the batch is diluted with water and extracted with methylene chloride. The methylene chloride solution is washed successively with water and sodium bicarbonate solution, dried with sodium sulfate and evaporated, to yield 2.2 grams of the lactone of 3β-acetoxy-5α-chloro-6β-hydroxy-17-oxo-androstane-19-acid which crystallizes on addition of ether and is freed from any adhering residual oxido compound by recrystalisation from alcohol. The pure compound melts at 198–199° C.

A mixture of 2.0 grams of 19:6β-lactone of 3β-acetoxy-5α-chloro-6β-hydroxy-17-oxo-androstane-18-acid, a paste of active zinc prepared by washing 100 g. of zinc dust with N-acetic acid and then with glacial acetic acid, and admixed with 40 cc. of glacial acetic acid to improve its stirrability is stirred under reflux for 2 hours. After this time the conversion of the above lactone into $\Delta^5$-3β-acetoxy-17-oxo-androstene-19-acid is complete. The excess zinc is suctioned off, the filtrate concentrated in vacuum, the residue taken up in chloroform, the chloroform solution is washed with 2 N-sulfuric acid and then with water, dried and evaporated, to yield said acid in the form of colorless crystals. After having been recrystallized from methanol+ether they melt at 252–253° C. without evolution of gas.

By treating the above acid in chloroform solution with ethereal diazomethane solution at room temperature for a few minutes, the $\Delta^5$-3β-acetoxy-17-oxo-androstene-19-acid methyl ester is obtained which melts at 188–189° C. after recrystallisation from ether.

A solution of 1.7 grams of $\Delta^5$-3β-acetoxy-17-oxo-androstene-19-acid methyl ester in 200 cc. of methanol is treated under nitrogen with a solution of 2 grams of potassium carbonate in 10 cc. of water and boiled and stirred for 1 hour. The reaction mixture is cooled, considerably concentrated under vacuum and then extracted with chloroform. The chloroform solution is dried and evaporated, to yield 1.5 grams of $\Delta^5$-3β-hydroxy-17-oxo-androstene-19-acid methyl ester which crystallizes from isopropanol in crystals melting at 188–190° C.

1.25 grams of the latter compound are dissolved in 50 cc. of acetone and the solution is treated at 0° C. with 1.5 cc. of a solution, diluted with water to 50 cc., of 13.3 grams of chromium trioxide and 11.5 cc. of concentrated sulfuric acid, and the mixture is stirred for 10 minutes. The reaction mixture is then poured into 100 cc. of an aqueous sodium acetate solution of 10% and extracted with methylene chloride. The crude product obtained from the extracts is the $\Delta^5$-3:17-dioxo-androstene-19-acid methyl ester which is dissolved in 100 cc. of methanol. The solution is treated with 5 grams of potassium hydroxide and heated for 5 hours at the boil under nitrogen. 7.5 cc. of glacial acetic acid are then added and the whole is evaporated almost to dryness in a water-jet vacuum. The residue is taken up in methylene chloride, washed with water and the dried organic solution is evaporated. From the residue $\Delta^4$-3:17-dioxo-19-nor-androstene is obtained by chromatography on alumina.

Example 5

200 cc. of ammonia are condensed in a stirring flask of 500 cc. capacity, and 1.5 grams of lithium metal are then added in small portions. The resulting blue solution is treated dropwise within 15 minutes with 1.95 grams of 3β:20β-diacetoxy-5α-chloro-6β:19-oxido-pregnane in 20 cc. of tetrahydrofuran and the whole is stirred for 1.5 hours longer. A mixture of 20 cc. of methanol and 100 cc. of ether is then slowly added, and the ammonia is allowed to evaporate. Finally, another 100 cc. of tetrahydrofuran are added, for 1 hour nitrogen is passed through the suspension which is then diluted with 200 cc. of water and repeatedly extracted with methylene chloride. The extracts are washed with dilute sulfuric acid and with water, dried and evaporated, to yield 1.82 grams of crude $\Delta^5$-3β:19:20β-trihydroxy-pregnene which is dissolved in 200 cc. of acetone and stirred for 35 minutes at 0° C. with 5.0 cc. of a solution, diluted with water to 50.0 cc. of 13.3 grams of chromium trioxide in 11.5 cc. of concentrated sulfuric acid. A solution of 50 grams of crystalline sodium acetate in 80 cc. of water is then added, the whole is diluted with 500 cc. of benzene, the solution is repeatedly washed with water, and the aqueous solution is repeatedly extracted with benzene. The solution is dried and evaporated in water-jet vacuum, and the residue is taken up in 100 cc. of chloroform and saturated at +10° C. with hydrogen chloride gas. The mixture is left to itself for 16 hours at 25° C. and then evaporated in a water-jet vacuum. Chromatography of the residue on 30 grams of alumina yields 810 mg. of 19-nor-progesterone melting at 141–144° C.

What is claimed is:

1. Process for the manufacture of 19-oxygenated $\Delta^5$-steroids, wherein a 5α-halogen-6β:19-oxido-steroid is treated with a metallic reducing agent.

2. Process according to claim 1, wherein 5α-halogen-6β:19-oxido-steroids are treated with a metal selected from the group consisting of an alkali metal and an alkaline earth metal, in a solvent selected from the group consisting of liquid ammonia and a liquid amino-alkane.

3. Process according to claim 1, wherein 6β:19-lactones of 5α-halogen-6β-hydroxy-steroid-19-acids are treated with zinc and a lower fatty acid.

4. $\Delta^5$-3β:17β:19-trihydroxy-androstene.

5. $\Delta^5$-3β-hydroxy-17-oxo-androstene-19-oic-acid.

6. A compound of the formula

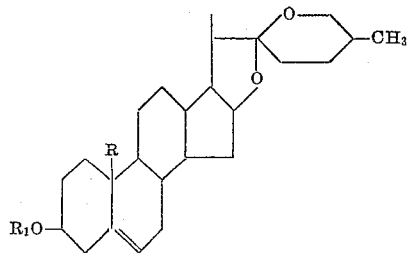

in which R represents a member selected from the group consisting of hydroxymethyl, lower alkanoyloxymethyl, formyl, carboxy and carbo-lower alkoxy and $R_1$ stands for a member selected from the group consisting of hydrogen and the acyl radical of a carboxylic acid containing up to 20 carbon atoms.

7. A compound of the formula

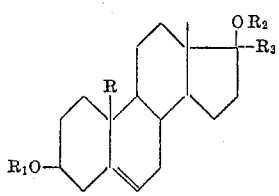

in which R represents a member selected from the group consisting of hydroxymethyl, lower alkanoyloxymethyl, formyl, carboxy and carbo-lower alkoxy, $R_1$ and $R_2$ stand for a member selected from the group consisting of hydrogen and the acyl radical of a carboxylic acid containing up to 20 carbon atoms and $R_3$ represents a member selected from the group consisting of hydrogen and lower alkyl.

8. $\Delta^5$-3$\beta$-acetoxy-17-oxo-androstene-19-oic acid methyl ester.

9. A compound of the formula

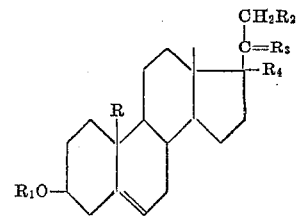

in which R represents a member selected from the group consisting of formyl, carboxy and carbo-lower alkoxy, $R_1$ stands for a member selected from the group consisting of hydrogen and the acyl radical of a carboxylic acid containing up to 20 carbon atoms, $R_2$ and $R_4$ represent a member selected from the group consisting of hydrogen, hydroxy and the acyloxy radical of a carboxylic acid containing up to 20 carbon atoms and $R_3$ stands for a member selected from the group consisting of oxo, lower alkylenedioxy, hydrogen together with hydroxy and hydrogen together with the acyloxy radical of a carboxylic acid containing up to 20 carbon atoms.

References Cited in the file of this patent

Ehrenstein et al.: J. Org. Chem., 16, 335–375 (1951).
Herzig et al.: J. Org. Chem., 17, 713–723 (1952).
Fieser et al.: Helv. Chim. Acta, Feb. 1, 1960, vol. 43, No. 1, pp. 102–4.